No. 855,257. PATENTED MAY 28, 1907.
J. A. McCLOSKEY.
CARPENTER'S SQUARE.
APPLICATION FILED FEB. 12, 1907.
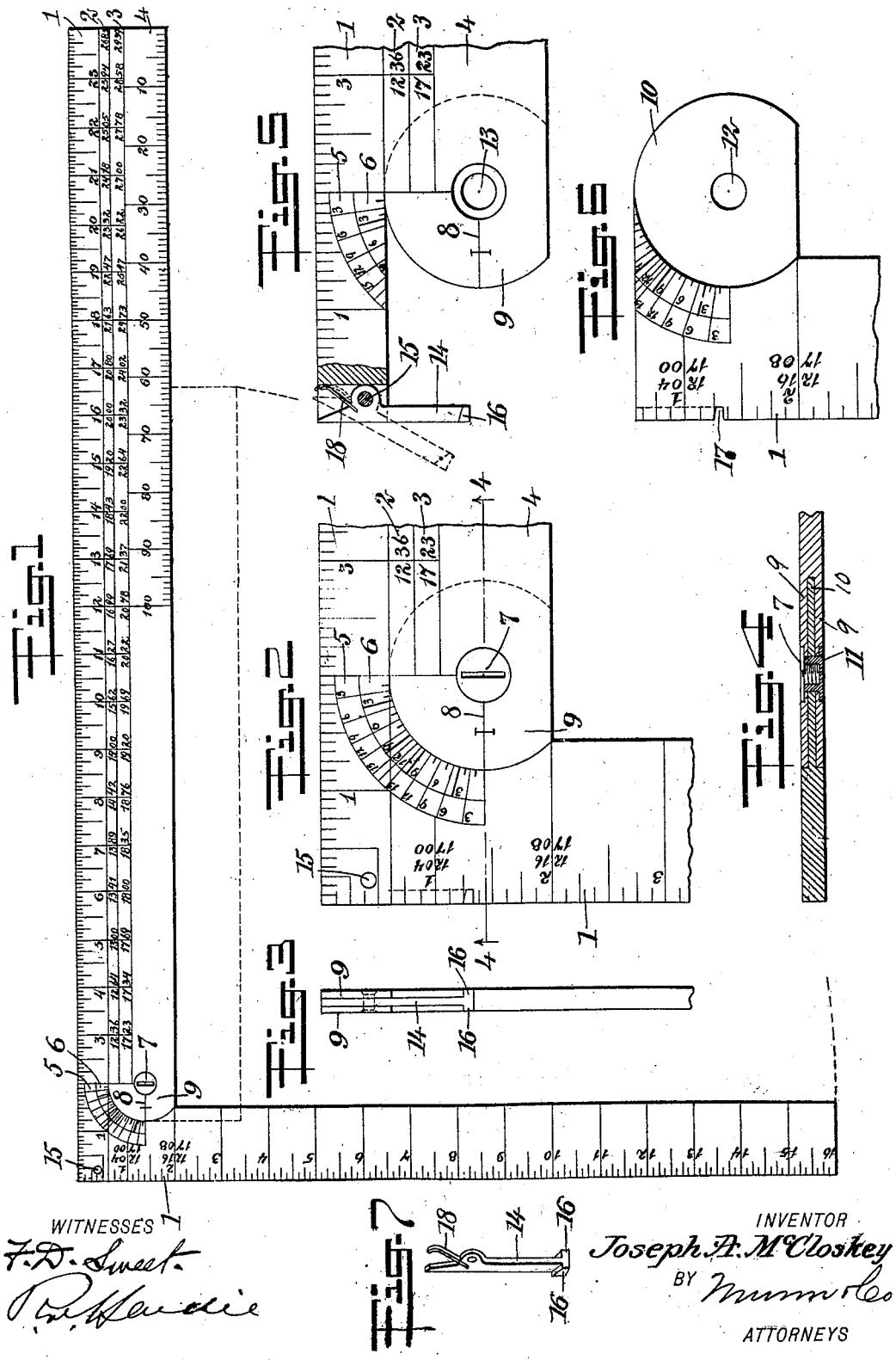
WITNESSES
INVENTOR
Joseph A. McCloskey
BY
ATTORNEYS

UNITED STATES PATENT OFFICE.

JOSEPH A. McCLOSKEY, OF MOUNT VERNON, NEW YORK.

CARPENTER'S SQUARE.

No. 855,257.

Specification of Letters Patent.

Patented May 28, 1907.

Application filed February 12, 1907. Serial No. 357,032.

*To all whom it may concern:*

Be it known that I, JOSEPH A. MCCLOSKEY, a citizen of the United States, and a resident of Mount Vernon, in the county of Westchester and State of New York, have invented a new and Improved Carpenters' Square, of which the following is a full, clear, and exact description.

This invention has for its object to provide means adapted to enable a builder to readily determine from a given pitch the length of common and hip rafters, and the cut of the ends of said rafters.

These objects I accomplish by the means illustrated in the accompanying drawings, in which drawings like characters of reference indicate like parts throughout the views, and in which, Figure 1 is a plan of a carpenters' square embodying my invention; Fig. 2 is an enlarged view of the meeting ends of the limbs of the square; Fig. 3 is an end view of the square shown in Fig. 1, partly broken away; Fig. 4 is a transverse section, taken on the line 4—4 of Fig. 2; Fig. 5 is a plan, partly broken away, of the end of the long limb of the square; Fig. 6 is a plan of the inner end of the short limb of the square; and Fig. 7 is a perspective view of a locking lever detachable from the square.

As illustrated in the drawings, the long limb of the square is provided with a scale 1 of inches, a scale 2 of factors used to determine the length of a common rafter, and a scale 3 of factors to determine the length of a hip rafter. Arranged in co-relation with said factors is a scale 4 of a foot divided into hundredths. If the pitch of a rafter is ten inches to the foot, and the run of the rafter fourteen feet, as in a building twenty-eight feet wide, by referring to the scale of inches it will be found that 15.62 is the factor to be used for a ten inch pitch; by multiplying said factor by fourteen, the length of the run of the rafter, the product will be 218.68 inches, or 18.22 feet. Again, if the pitch of a hip rafter is 10 inches and the run fourteen feet, the factor for the hip rafter will be 19.69. This multiplied by fourteen will give 275.66 inches, or 22.97 feet, and by referring to the scale of hundredths of a foot and the scale of inches it may readily be determined what is the equivalent in inches of .22 and .97 of a foot. The vertical and horizontal cuts of the ends of said rafters are determined by means of a protractor extending across the pivoted ends of the limbs of the square, and provided with a scale 5 of graduations for measuring the cuts of a hip or valley rafter, and an adjacent scale 6 for measuring cuts of common rafters. These scales are concentric with each other and with a pivotal screw 7, which joins the limbs of the square together. A registering line 8 extends from the center of the pivotal connection between said limbs and across a mutilated circular end 9 formed on the inner portion of the long limb of the square, as clearly shown in Fig. 5.

To determine the vertical cut of the end of a common rafter having a pitch of three inches to the foot, the short limb of the square is moved toward the long limb until the line 3 of the inner scale 6 on the left of the protractor is brought into registry with the line 8. The inner edges of the limbs of the square will then indicate the vertical cut of the end of the common rafter. To determine the angle of the opposite end of the rafter, the short limb is brought nearer to the long limb of the square until the line 3 at the right of the scale 6 is brought into registry with the line 8; the inner edges of the limbs of the square will then indicate the angle of inclination of the horizontal cut of the rafter. To determine the inclination of the cuts of the hip or valley rafters, the same method is followed, using the scale 5, however, instead of the scale 6.

In carrying out my invention, I have provided the square shown in the accompanying drawings, the inner end of the short limb of the square being provided with a mutilated circular flange 10 adapted to engage a recess formed in the mutilated end 9 of the long limb of the square, to permit said limb being pivotally connected by means of the screw 7 which preferably has a threaded engagement with a head 11 shown in Fig. 4, extending through apertures 12 and 13 in the short and long limbs of the square respectively. The limbs of the square are held at a right angle by means of a locking lever 14 which is pivotally mounted upon a pin 15 attached to the long limb of the square, as shown in Fig. 5, and provided on one end with laterally extending off-set lips 16 adapted to engage a notch 17 formed in the edge of the short limb of the square and held normally in engagement with said notch by means of a spring 18. When it is desired to use the protractor to determine the cut of the ends of a rafter, the short end of the lever 14 is depressed releasing the opposite end of the lever from engagement with the notch of the adjacent limb, thereby enabling the short limb to be moved on its pivotal connection with the long limb of the square.

Having thus described my invention, what I claim as new and desire to secure by Letters Patent is:

1. A carpenters' square having two arms of unequal length pivoted together, and provided with a protractor extending across the pivoted ends of both of said arms and provided with a scale for determining the angle of inclination of the ends of a common rafter, and a scale for determining the angle of inclination of the ends of a hip rafter of predetermined pitch, substantially as shown and described.

2. A carpenters' square having two arms of unequal length pivoted together and provided with a protractor extending across the pivoted ends of both of said arms, having scales reading similarly from each end to the center and adapted to indicate by means of the inner edges of the arms of said square the angle of inclination at the ends of a hip or valley rafter having a predetermined pitch, substantially as shown and described.

3. A carpenters' square having arms of unequal length pivoted together, and provided with a protractor extending across the pivotal ends of both of said arms, the protractor comprising two scales reading similarly from each end to the center, one of said scales measuring the inclination of the opposite ends of a hip rafter, the other scale measuring the inclination of the opposite ends of a common rafter, as indicated by the relative position of the inner edges of said arms, substantially as shown and described.

In testimony whereof I have signed my name to this specification in the presence of two subscribing witnesses.

JOSEPH A. McCLOSKEY.

Witnesses:
ROBERT W. HARDIE,
EVERARD B. MARSHALL.